(12) United States Patent
Horie et al.

(10) Patent No.: US 6,349,082 B1
(45) Date of Patent: Feb. 19, 2002

(54) OPTICAL DISC APPARATUS

(75) Inventors: Kazuyoshi Horie; Kuninori Shino, both of Tokyo; Shigeo Kubota, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/376,178

(22) Filed: Aug. 17, 1999

(30) Foreign Application Priority Data

Aug. 24, 1998 (JP) .......................................... 10-236930

(51) Int. Cl.[7] .............................................. G11B 7/135
(52) U.S. Cl. ............................ 369/112.21; 369/110.01; 369/44.23
(58) Field of Search .......................... 369/44.23, 44.11, 369/44.12, 44.14, 44.24, 44.28, 44.32, 44.37, 44.41, 110.01, 110.04, 112.01, 112.05, 112.16, 112.17, 112.21, 112.27

(56) References Cited

U.S. PATENT DOCUMENTS 5,453,961 A * 9/1995 Brazas ..................... 369/44.23
5,850,375 A * 12/1998 Wilde et al. ........ 369/112.27 X
6,275,455 B1 * 8/2001 Belsar .................. 369/44.28 X

* cited by examiner

Primary Examiner—Muhammad Edun
(74) Attorney, Agent, or Firm—Sonnenschein, Nath & Rosenthal

(57) ABSTRACT

Disclosed is an optical disc apparatus compatible with both ROM type and RAM type optical discs having high density and large capacity. An optical disc apparatus includes: a disc control device including an optical disc (a magneto-optical disc), a spindle motor for rotating the optical disc, an objective lens for forming a light spot on the optical disc, and a control drive device which controls and drives the objective lens in the tracking direction of the optical disc, a semiconductor laser serving as a light source, a signal light transfer having a polarization-preserving optical fiber for guiding output light from the semiconductor laser to the objective lens, ¼ wave plates provided in optical paths on both sides of the polarization-preserving optical fiber, and signal detecting devices (polarization beam splitter and photo detectors) for detecting a servo signal, etc. from the reflected light from the optical disc.

13 Claims, 13 Drawing Sheets

OPTICAL DISC APPARATUS

BACKGROUND OF THE INVENTION

1. Field of the Invention

The present invention relates to an optical disc apparatus and, in particular, to an optical disc apparatus in which the optical path for the output light from the light source consisting of a semiconductor laser or the like and the reflected light from the optical disc is formed by a polarization-preserving optical fiber.

2. Description of the Related Art

ROM (read only memory) type optical discs such as CDs (compact discs) and RAM (random access memory) type optical discs such as phase change discs and magneto-optical discs are widely used as media for storing information such as image information, sound information or programs for information apparatuses in the form of pit patterns, recording marks, etc. The density and capacity of such optical discs are gradually increasing, and, in optical disc apparatuses for these discs, the diameter of the light spot condensed through an objective lens is reduced by, for example, reducing the wavelength of the semiconductor laser or increasing the NA (numerical aperture) of the objective lens. For example, in the CDs commercially manufactured in relatively early times, the wavelength of the light source is set to be 780 nm, whereas in the DVDs (digital video discs or digital versatile discs) commercially manufactured in recent times, the wavelength of the light source is set to be 650 nm or 635 nm. Recently, a further increase in the density and capacity of the optical disc is desired and realized, and an optical disc apparatus which is compatible with both a ROM type and a RAM type optical disc is required.

SUMMARY OF THE INVENTION

It is an object of the present invention to provide an optical disc apparatus which is compatible with both a ROM type and a RAM type optical disc having high density and large capacity.

To achieve the above object, there is provided, according to Claim 1 of the present invention, an optical disc apparatus comprising:

disc control means including
  an optical disc;
  a spindle motor for rotating the optical disc at a predetermined speed;
  an objective lens for forming a light spot on the optical disc; and
  control drive means which forms a rotary linear motor in which the objective lens is secured to one end of an arm that rotates around a central shaft provided at the other end of the arm and which controls and drives the objective lens in the tracking direction of the optical disc;
a light source formed by a semiconductor laser or the like;
signal light transfer means in which the optical path for guiding output light from the light source to the objective lens is formed of a polarization-preserving optical fiber;
a wave plate provided in an optical path on either side of the polarization-preserving optical fiber; and
signal detecting means for receiving the reflected light from the optical disc and subjecting it to photoelectric conversion to detect, for example, a focusing error signal, a tracking error signal, a servo signal supplying information on the position on the optical disc where recording or reproduction is effected, and an RF signal.

According to Claim 2 of the present invention, there is provided an optical disc apparatus comprising:

disc control means including
  a plurality of optical discs;
  a spindle motor for rotating the plurality of optical discs integrally and at a predetermined speed;
  a plurality of objective lenses for forming light spots on the individual optical discs; and
  control drive means for controlling and driving a plurality of objective lenses integrally in the tracking direction of the optical disc;
a light source formed, for example, by a semiconductor laser;
signal light transfer means in which the optical paths for guiding output light from the light source to the individual objective lenses are formed of a plurality of polarization-preserving optical fibers;
a wave plate provided in the optical path on either side of the plurality of polarization-preserving optical fibers;
signal optical path switching means which includes decentered light emitting means which is arranged between the light source and the signal light transfer means and which selects one output light from the light source from among the plurality of polarization-preserving optical fibers, for example, outputs incident light incident in conformity with the rotation center axis from a position parallel to and decentered from the rotation center axis and in which the plurality of polarization-preserving optical fibers are arranged in a circumference in conformity with the optical axis of the output light from the decentered light emitting means; and
signal detecting means which receives the reflected light from the optical disc and subjects it to photoelectric conversion to detect, for example, a focusing error signal, a tracking error signal, a servo signal providing positional information on the position of the optical disc where recording or reproduction is effected, and an RF signal.

According to Claim 3 of the present invention, there is provided a disc apparatus comprising:

disc control means including
  a plurality of optical discs;
  a spindle motor for rotating the plurality of optical discs integrally and at a predetermined speed;
  a plurality of objective lenses for forming light spots on the individual optical discs; and
  control drive means which forms, for example, a rotary linear motor in which the objective lens is secured to one end of an arm that rotates around a central shaft provided at the other end of the arm and which controls and drives the objective lens independently in the tracking direction of the optical discs with respect to the individual optical discs, that is, control drive means in the same number as the optical discs and operating independently;
a light source formed, for example, by a semiconductor laser;
signal light transfer means in which the optical paths for guiding output light from the light source to the individual objective lenses are formed of a plurality of polarization-preserving optical fibers;
a wave plate provided in the optical path on either side of the plurality of polarization-preserving optical fibers;

signal optical path switching means which includes decentered light emitting means which is arranged between the light source and the signal light transfer means and which selects one output light from the light source from among the plurality of polarization-preserving optical fibers, for example, outputs incident light incident in conformity with the rotation center axis from a position parallel to and decentered from the rotation center axis and in which the plurality of polarization-preserving optical fibers are arranged in a circumference in conformity with the optical axis of the output light from the decentered light emitting means; and signal detecting means which receives the reflected light from the optical disc and subjects it to photoelectric conversion to detect, for example, a focusing error signal, a tracking error signal, a servo signal providing positional information on the position of the optical disc where recording or reproduction is effected, and an RF signal.

It is desirable for the angle of the crystal axis of the wave plate in the optical disc apparatus as claimed in Claims 1, 2 and 3 to be inclined (45+90×N) degrees with respect to the refractive index distribution axis of the polarization-preserving optical fiber (the axis connecting the centers of stress imparting portions paired with the clad, that is, the portions where refractive index distribution exists, in the section cut from a direction perpendicular to the longitudinal direction of the polarization-preserving optical fiber).

According to Claim 8 of the present invention, there is provided an optical disc apparatus comprising:

disc control means including an optical disc;

a spindle motor for rotating the optical disc at a predetermined speed;

an objective lens for forming a light spot on the optical disc; and control drive means which forms a rotary linear motor in which the objective lens is secured to one end of an arm that rotates around a central shaft provided at the other end of the arm and which controls and drives the objective lens in the tracking direction of the optical disc;

a light source formed, for example, by a semiconductor laser;

signal light transfer means in which the optical path guiding the output light from the light source to the objective lens is formed by one polarization-preserving optical fiber formed by joining two polarization-preserving optical fibers in which the refractive index distribution axes are caused to intersect each other at right angles to cancel the phase difference generated in the polarization-preserving optical fibers; and signal detecting means for receiving the reflected light from the optical disc and subjecting it to photoelectric conversion to detect, for example, a focusing error signal, a tracking error signal, a servo signal supplying information on the position on the optical disc where recording or reproduction is effected, and an RF signal.

According to Claim 9 of the present invention, there is provided an optical disc apparatus comprising:

disc control means including a plurality of optical discs;

a spindle motor for rotating the plurality of discs integrally at a predetermined speed;

a plurality of objective lenses for forming light spots on the individual optical discs; and control drive means for controlling and driving the plurality of objective lenses integrally in the tracking direction of the optical discs;

a light source formed, for example, by a semiconductor laser;

signal light transfer means in which the optical path guiding the output light from the light source to the individual objective lenses is formed by a plurality of polarization-preserving optical fibers formed by joining two polarization-preserving optical fibers in which the refractive index distribution axes are caused to intersect each other at right angles to cancel the phase difference generated in the polarization-preserving optical fibers;

signal optical path switching means which includes decentered light emitting means which is arranged between the light source and the signal light transfer means and which selects one output light from the light source from among the plurality of polarization-preserving optical fibers, for example, outputs incident light incident in conformity with the rotation center axis from a position parallel to and decentered from the rotation center axis and in which the plurality of polarization-preserving optical fibers are arranged in a circumference in conformity with the optical axis of the output light from the decentered light emitting means; and signal detecting means for receiving the reflected light from the optical disc and subjecting it to photoelectric conversion to detect, for example, a focusing error signal, a tracking error signal, a servo signal supplying information on the position on the optical disc where recording or reproduction is effected, and an RF signal.

According to Claim 10 of the present invention, there is provided an optical disc apparatus comprising:

disc control means including a plurality of optical discs;

a spindle motor for rotating the plurality of optical discs integrally at a predetermined speed;

a plurality of objective lenses for forming light spots on the individual optical discs; and control drive means, that is, control drive means in the same number as the optical discs and operating independently, which controls and drives the objective lenses independently in the tracking direction of the optical discs relative to the individual optical discs and which forms a rotary linear motor in which, for example, the objective lens is secured to one end of an arm that rotates around a central shaft provided at the other end of the arm;

a light source formed, for example, by a semiconductor laser;

signal light transfer means in which the optical path guiding the output light from the light source to the individual objective lenses is formed by a plurality of polarization-preserving optical fibers formed by joining two polarization-preserving optical fibers in which the refractive index distribution axes are caused to intersect each other at right angles to cancel the phase difference generated in the polarization-preserving optical fibers;

signal optical path switching means which includes decentered light emitting means which is arranged between the light source and the signal light transfer means and which selects one output light from the light source from among the plurality of polarization-preserving optical fibers, for example, outputs incident light incident in conformity with the rotation center axis from a position parallel to and decentered from the rotation center axis and in which the plurality of polarization-preserving optical fibers are arranged in a circumference in conformity with the optical axis of the output light from the decentered light emitting means; and signal detecting means for receiving the reflected light from the optical disc and subjecting it to photoelectric conversion to detect, for example, a focusing error signal, a tracking error signal, a servo signal supplying information on the position on the optical disc where recording or reproduction is effected, and an RF signal.

In the optical disc apparatus according to Claims 1 and 8 of the present invention, the optical disc attached to the spindle motor may be ROM type or RAM type. Further, in the optical disc apparatus according to Claims 2, 3, 9 and 10 of the present invention, the plurality of optical discs attached to the spindle motor are all ROM type optical discs, all RAM type optical discs, or ROM type optical discs and RAM type optical discs mixed together in an arbitrary proportion.

The operation of the above-described means is as follows.

In the optical discs according to Claims 1, 2 and 3 of the present invention, in which a wave plate is arranged in the optical path on either side of the polarization-preserving preserving optical fiber, the signal light which involves a change in quantity of light as in the case of a pit pattern disc and a phase change disc is transmitted without being influenced, and, in the case of a magneto-optical disc, it is possible to correct the phase difference of the electric field oscillation component perpendicular to the magneto-optical signal light. Further, in the optical discs according to Claims 8, 9 and 10, in which the optical path is formed by a polarization-preserving optical fiber formed by joining two polarization-preserving optical fibers the refractive index distribution axes of which are perpendicular to each other, the signal light reflected by the optical disc and returned is transmitted without being influence as in the case of a pit pattern disc and a phase change disc, and, in the case of a magneto-optical disc, the phase difference generated in the polarization-preserving optical fiber can be canceled. Further, in the optical disc apparatus according to Claims 2, 3, 9 and 10, in which a plurality of optical discs are attached to the spindle motor, there is no need to prepare a dedicated optical source, photo detector, etc. for each optical disc due to the signal optical path switching means, whereby it is possible to construct a simple optical system.

DESCRIPTION OF THE PREFERRED EMBODIMENTS

Figure 1:
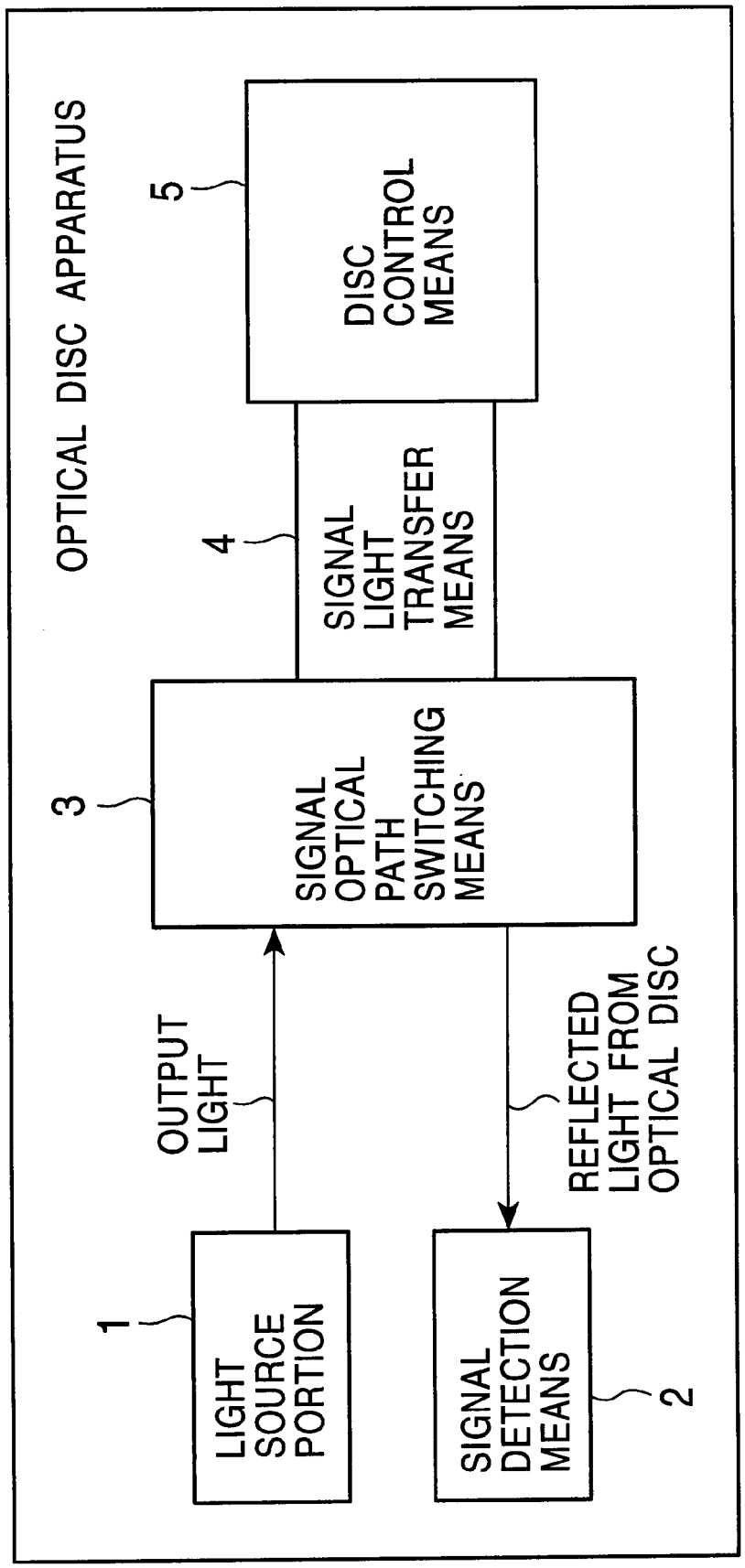
FIG. 1 is a schematic diagram showing an optical disc apparatus according to the present invention.

As shown in FIG. 1, which is a schematic diagram, the optical disc apparatus of the present invention substantially comprises a light source portion 1, a signal detecting means 2, a signal optical path switching means 3, a signal light transfer means 4, and a disc control means 5.

The light source portion 1 substantially comprises a light source consisting, for example, a semiconductor laser, a joint lens for condensing the output light from the light source, etc. The disc control means 5 substantially comprises a spindle motor for rotating an optical disc at a predetermined speed, an objective lens for forming a light spot on the optical disc, and a control drive means for controlling and driving the objective lens in the tracking direction of the optical disc. The signal light transfer means guides the output light from the light source to the objective lens and constitutes the optical path for guiding the reflected light from the optical disc; it is formed by polarization-preserving optical fibers. The signal optical path switching means 3 selects one of a plurality of polarization-preserving optical fibers guiding output light from the light source formed in the sign al light transfer means 4; it is not necessary in an optical disc apparatus in which one optical disc is attached to the spindle motor of the disc control means 5. The signal detecting means 2 is formed by a photo detector or the like having a plurality of photoelectric conversion element patterns to receive the reflected light from the optical disc and detect, for example, a focusing error signal, a tracking error signal, a servo signal providing positional information on the position of the optical disc where recording or reproduction is effected, and an RF signal.

The optical disc constituting the optical disc apparatus of the present invention may be ROM type or RAM type; in a construction in which a plurality of optical discs are attached to the spindle motor all the optical discs may be ROM type or RAM type or ROM type optical discs and RAM type optical discs may be mixed in an arbitrary proportion. That is, the optical disc apparatus of the present invention may be an optical disc apparatus for recording only, an optical disc apparatus for reproduction only, or an optical disc apparatus for both recording and reproduction. Embodiments of the optical disc apparatus of the present invention will now be described with reference to FIGS. 2 through 18.

First Embodiment

Figure 2:
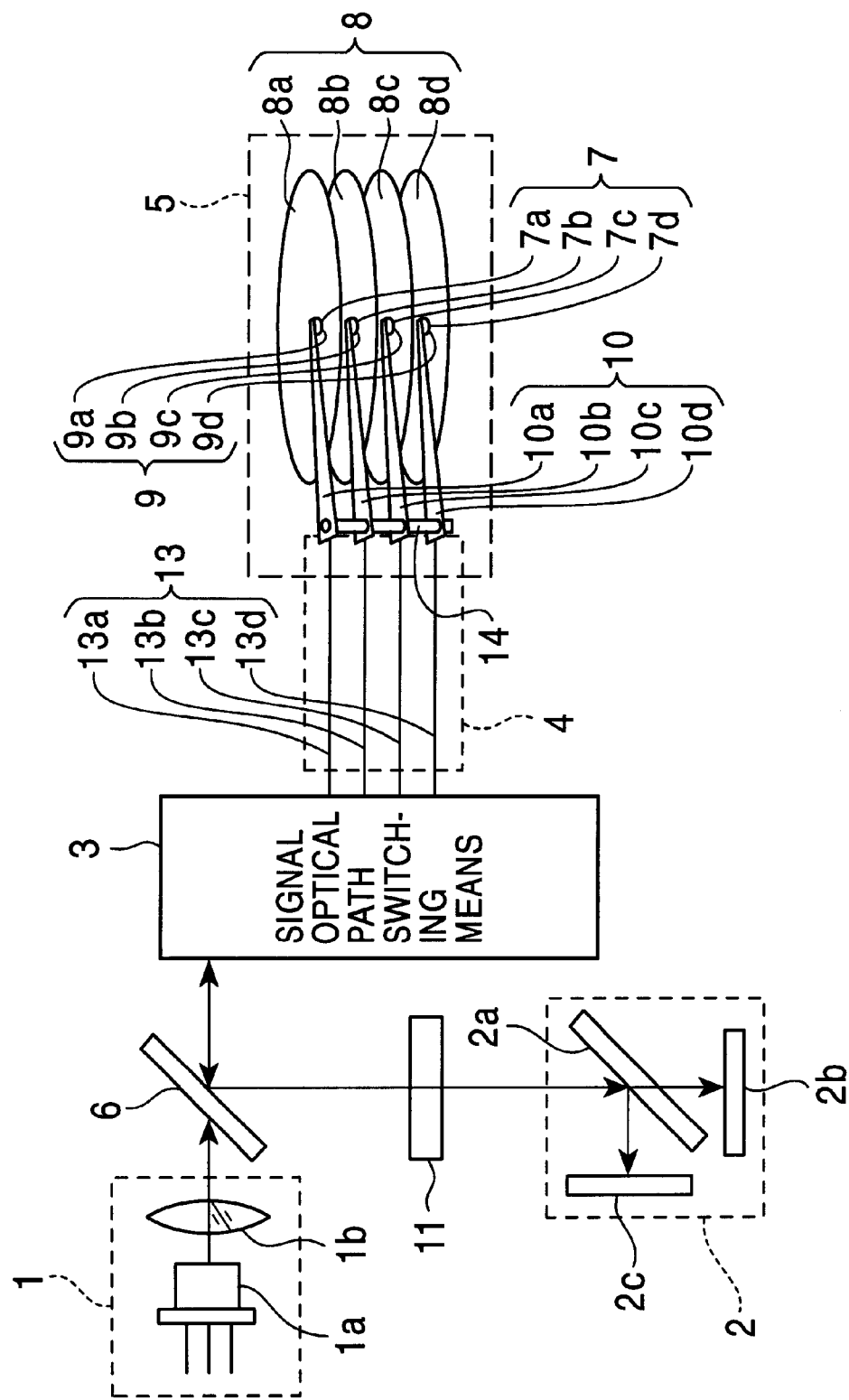
FIG. 2 is a schematic diagram showing an optical disc apparatus according to a first embodiment of the present invention.

In the optical disc apparatus of this embodiment, the optical disc attached to the spindle motor is a magneto-optical optical disc, and ¼ wave plates 11 and 12 for correcting the phase difference of orthogonal electric field oscillation components of the magneto-optical signal are arranged on the optical paths on both sides of a polarization-preserving optical fiber 13. This will be described with reference to FIG. 2, which is a schematic diagram of an optical disc apparatus in which four magneto-optical optical discs 8 are attached to a spindle motor formed in the disc control means 5, and FIG. 3, which is a schematic diagram of the signal optical path switching means 3 shown in FIG. 2. In FIG. 2, the ¼ wave plate 11 arranged in the optical path on one side of the polarization-preserving optical fiber 13 is shown, whereas the ¼ wave plate 12 arranged on the other side thereof and shown in FIG. 7, which will be referred to below, is not shown. One or a plurality of magneto-optical discs 8 are provided. The number of discs is not restricted to four, which is the case in FIG. 2.

Figure 3:
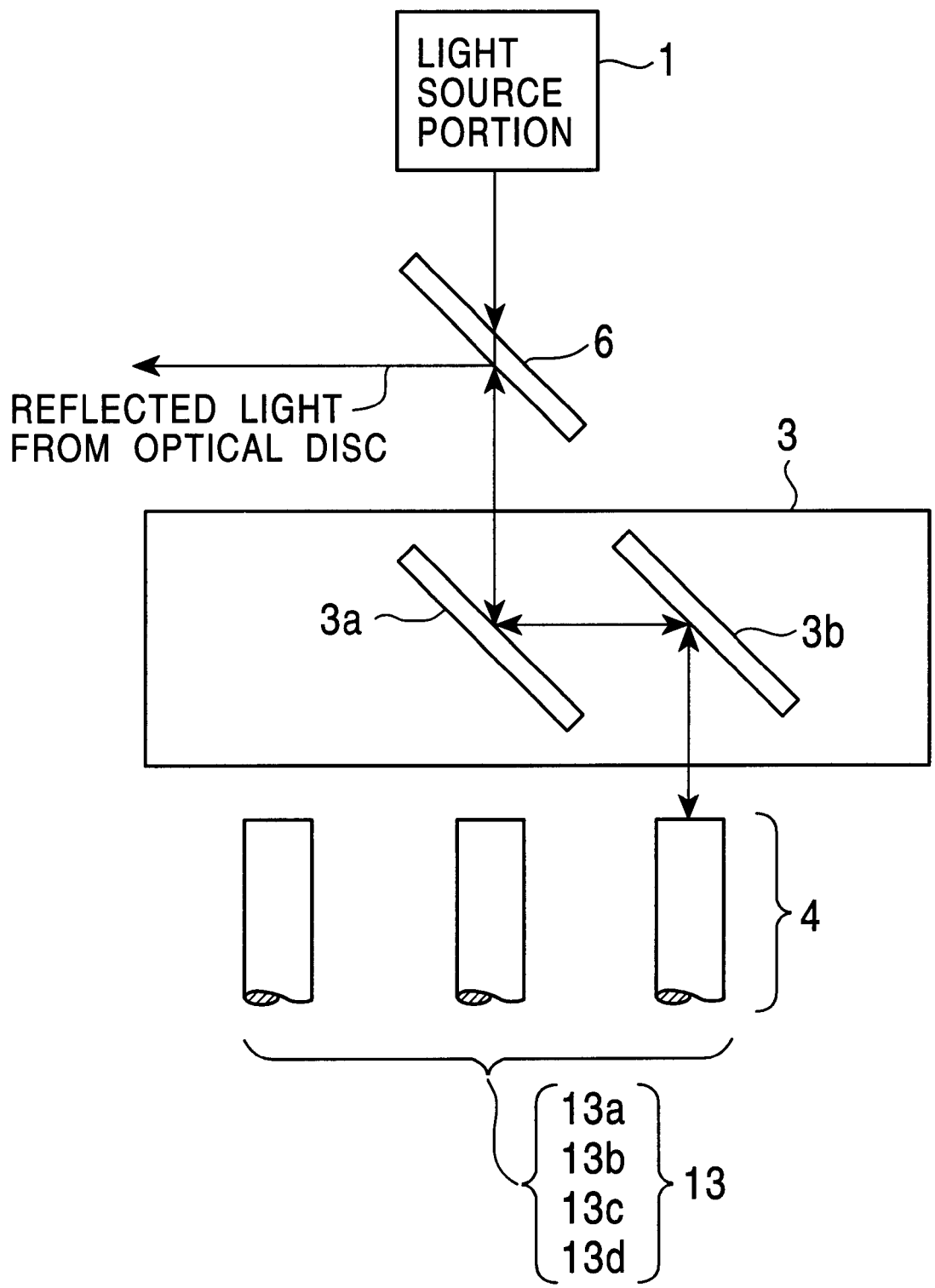
FIG. 3 is a schematic diagram showing a signal optical path switching means constituting the optical disc shown in FIG. 2.

The output light from the semiconductor laser 1a, which is the light source, is condensed by the joint lens 1b, and transmitted through a beam splitter 6 before it impinges upon the signal optical path switching means 3. As shown in FIG. 3, the signal optical path switching means 3 is a decentered light outputting means outputting incident light incident in conformity, for example, with the rotation center axis from a position parallel to and decentered from the rotation center axis. For example, a pair of mirrors 3a and 3b which are inclined 45 degrees with respect to the rotation center axis of a rotating means such as a stepping motor (not shown) and parallel thereto are arranged in the rotation center axis and at a position decentered therefrom. In FIG. 3, the mirror 3a is arranged in the rotation center axis and the mirror 3b is arranged at the decentered position.

By the above-mentioned rotating means such as a stepping motor, control is effected such that the optical axis of the light reflected by the mirror 3b arranged at the decentered position coincides with the optical axis center of one polarization-preserving optical fiber selected from the first through fourth polarization-preserving optical fibers 13a through 13d constituting the signal light transfer means 4. For example, when the first polarization-preserving preserving optical fiber 13a is selected, the light emitted from the semiconductor laser 1a and transmitted through the first polarization-preserving optical fiber 13a and the ¼ wave plate (not shown) is transmitted through the first objective lens 7a land converges on the signal recording surface of the first magneto-optical disc 8a to form a light spot. Similarly, when the second, third or fourth polarization-preserving optical fiber 13b, 13c or 13d is selected, the light emitted from the semiconductor laser 1a and transmitted through the second, third or fourth polarization-preserving optical fiber 13b, 13c or 13d and the ¼ wave plate 12 is transmitted through the second, third or fourth objective lens 7b, 7c or 7d and converges on the signal recording surface of the second, third and fourth magneto-optical disc 8b, 8c or 8d to form a light spot. That is, by a single semiconductor laser 1a, which is the light source, recording/reproduction is possible individually to/from the first through fourth optical discs 8a through 8d.

The first through fourth objective lenses 7a through 7d are firmly attached to first through fourth sliders 9a through 9d which fly over the surfaces of the first through fourth magneto-optical discs 8a through 8d with a substantially fixed gap by utilizing the airflow generated, for example, by the rotation of the first through fourth magneto-optical discs 8a through 8d. The first through fourth sliders 9a through 9d are firmly attached to one ends of first through fourth arms 10a through 10d, and a rotation shaft 14 is provided at the other end thereof. Further, there is formed a control drive means (not shown) which is formed, for example, by a rotary linear motor and which rotates the first through fourth arms 1a through 10d integrally or independently around the rotation shaft 14. When performing recording, a magnetic field is applied to the light spot portions of the first through fourth magneto-optical optical discs 8a through 8d.

For example, the light reflected from the information recording surface of the first magneto-optical disc 8a is transmitted through the first objective lens 7a and the ¼ wave plate 12 and guided to the first polarization-preserving preserving optical fiber 13a, and is reflected by the pair of mirrors 3b and 3a constituting the signal optical path switching means 3 and the beam splitter 6 and transmitted through the ¼ wave plate 11 to impinge upon the signal detecting means 2. The light transmitted through the polarization beam splitter 2a constituting the signal detecting means 2 impinges upon the photo detector 2b, and the light reflected by the polarization beam splitter 2a impinges upon the photo detector 2c. In these photo detectors 2b and 2c, a focusing error signal, a tracking error signal, a servo signal supplying information on the position on the first magneto-optical disc 8a where recording or reproduction is effected, an RF signal, etc. are detected. The detection of the magneto-optical signal can be effected through a difference signal of the photo detector 2b and the photo detector 2c.

The above-mentioned signal light transfer means 4 is required to have no birefringence, which makes it difficult to preserve the polarization state of the magneto-optical signal light transferred, that is, the linearly polarized light. A polarization-preserving optical fiber 13 which makes it possible to know the refractive index distribution in advance is used, and wave plates are arranged in the optical paths on both sides of the polarization-preserving optical fiber 13, whereby it is possible to correct the polarization state of the magneto-optical signal light disturbed by the birefringence of the polarization-preserving preserving optical fiber 13. The reason for this will be explained with reference to FIGS. 4 through 13.

Figure 4:
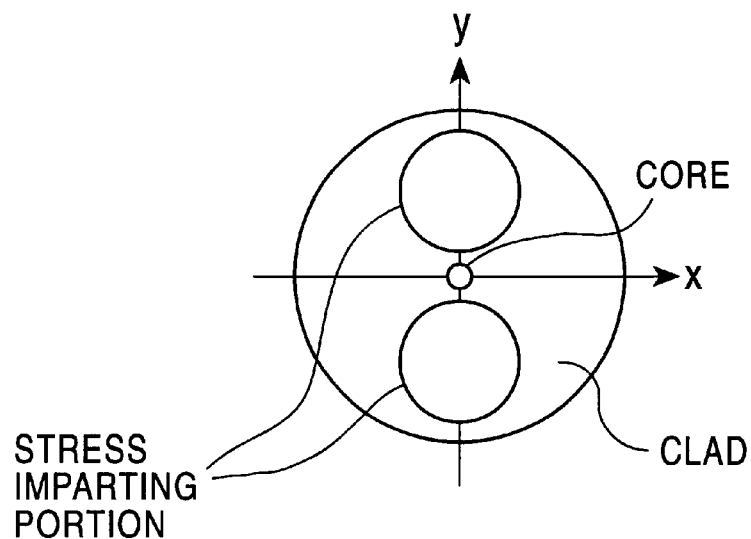
FIG. 4 is a schematic sectional view showing a PANDA type polarization-preserving optical fiber.

FIG. 4 is a schematic sectional view of a PANDA type polarization-preserving optical fiber which is an example of the polarization-preserving optical fiber 13.

The PANDA type polarization-preserving optical fiber is composed of a core having a diameter of approximately 5 μm, a pair of stress imparting portions provided on both sides of this core, and a clad surrounding the core and the pair of stress imparting portions and having a diameter of approximately 125 μm. Generally speaking, light traveling through the core propagates while repeating total reflection at the boundary between the core and the clad. When, as shown in FIG. 4, the section perpendicular to the optical axis of the core is given as plane coordinates, and the direction of the line connecting the center of the pair of stress imparting portions and the center of the core is indicated by the y-axis, and the direction perpendicular thereto is given as the x-axis, when stress is applied in the y-axis direction of the core, a refractive index difference, that is, birefringence, is generated in the x-axis direction and the y-axis direction of the core.

Figure 5:
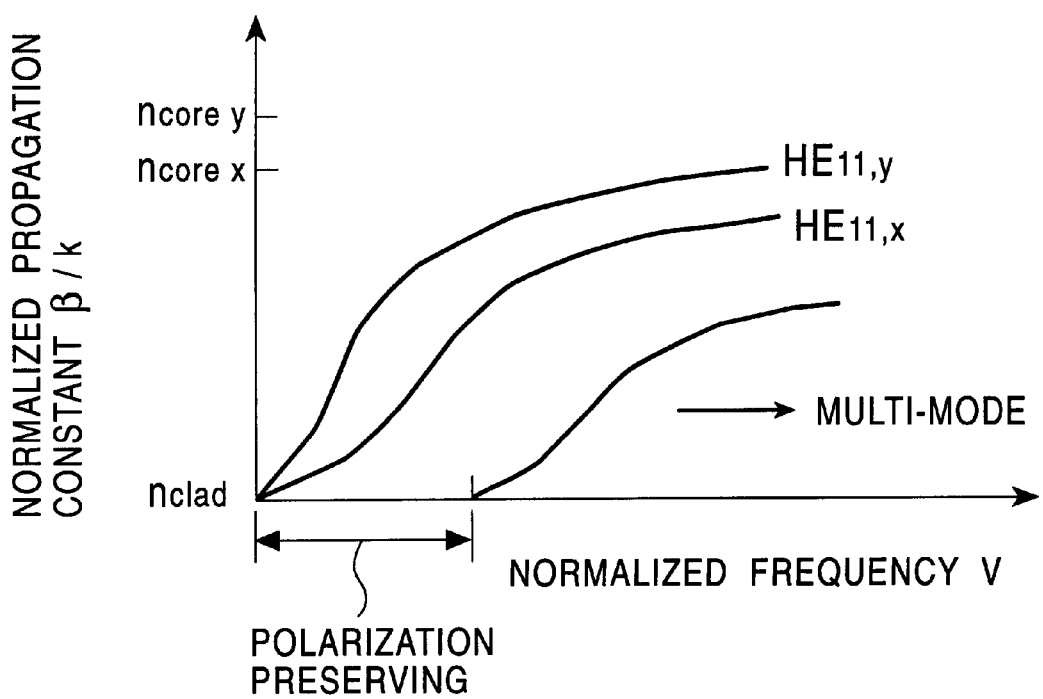
FIG. 5 is a dispersion characteristic diagram of the propagation mode of a polarization-preserving optical fiber according to the present invention.
Figure 6:
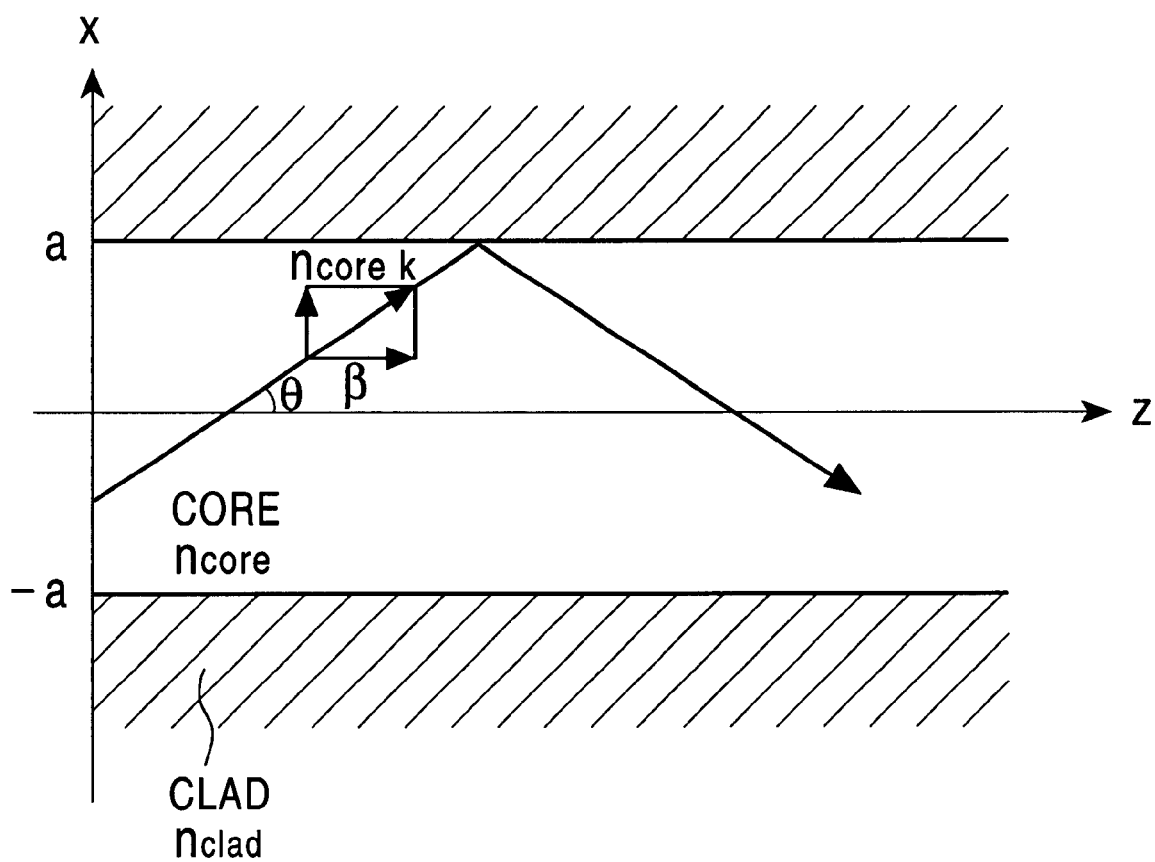
FIG. 6 is a schematic sectional view of a core constituting a polarization-preserving optical fiber according to the present invention, illustrating the relationship between propagation constant and wave number.

FIG. 5 is a propagation mode dispersion characteristic diagram of the polarization-preserving optical fiber 13, showing multi-mode dispersion which causes delay distortion in a pulse signal in the polarization-preserving optical fiber 13. The normalized frequency V is a dimensionless amount which can be represented as: $V=(2\pi a/\lambda)(n_{core}^2 - n_{clad}^2)^{1/2}$ (where a: core radius, λ: wavelength, $n_{core}$: core refractive index, $n_{clad}$: clad refractive index). The normalized propagation constant β/k can be obtained by dividing the propagation constant β in the length direction of the polarization-preserving optical fiber 13 by wave number k=2π/λ. The relationship between the propagation constant β and the wave number k will be explained with reference to FIG. 6, which is a schematic sectional view of the core in the z-direction perpendicular to the x- and y-directions in FIG. 5.

Assuming that light having a propagation angle θ is propagating through the core, the propagation constant in the direction in which the light travels can be expressed as $n_{core}k$, the propagation constant β in the z-direction can be expressed as $n_{core}k\cos\theta$, and the normalized propagation constant β/k can be expressed as: $\beta/k=n_{core}\cos\theta$. That is, the smaller the propagation angle θ, the closer the normalized propagation constant β/k to the core refractive index $n_{core}$. Conversely, at an angle $\theta_{cutoff}$ at which the propagation angle θ is large, the normalized propagation constant β/k is the clad refractive index $n_{clad}$. Thus, when the normalized propagation constant β/k becomes closer to the core refractive index $n_{core}$, the light is trapped in the core and propagates, and, when the normalized propagation constant β/k becomes closer to the clad refractive index $n_{clad}$, the light cannot be trapped in the core, and the propagation of the light is difficult.

The propagation mode of the propagation of light through the polarization-preserving optical fiber 13 will be described with reference to FIG. 5 again.

The propagation mode of light propagating through a core having no birefringence is degenerated. When there is birefringence, the degeneracy is canceled, and divided into two propagation modes $HE_{11,x}$ and $HE_{11,y}$ shown in FIG. 5. Here, the term degeneracy means a state in which the degree of freedom in propagation mode is reduced. As is apparent from FIG. 5, it is understood that it is in the range of the normalized frequency at which only $HE_{11,x}$ and $HE_{11,y}$ propagate. This range is called polarization-preserving operation range, in which the polarization-preserving optical fiber 13 holds good. At the value of this normalized frequency V, birefringence naturally exists in the core of the polarization-preserving optical fiber 13. When the normalized frequency V further increases from the polarization-preserving operation range, a multi-mode is attained, and multi-mode dispersion is generated, making it difficult to propagate the magneto-optical signal light. The wavelength at which this multi-mode is attained is generally referred to as cutoff wavelength. The polarization-preserving optical fiber 13 as mentioned above is on the market. For example, when a semiconductor laser 1a having a wavelength λ of 633 nm is used, the birefringence difference is approximately 6×10⁻⁴, and the cutoff wavelength is approximately 600 nm. The direction of refractive index distribution of the polarization-preserving optical fiber 13 can be known at the stage when the polarization-preserving optical fiber 13 is supplied from the manufacturer.

Figure 7:
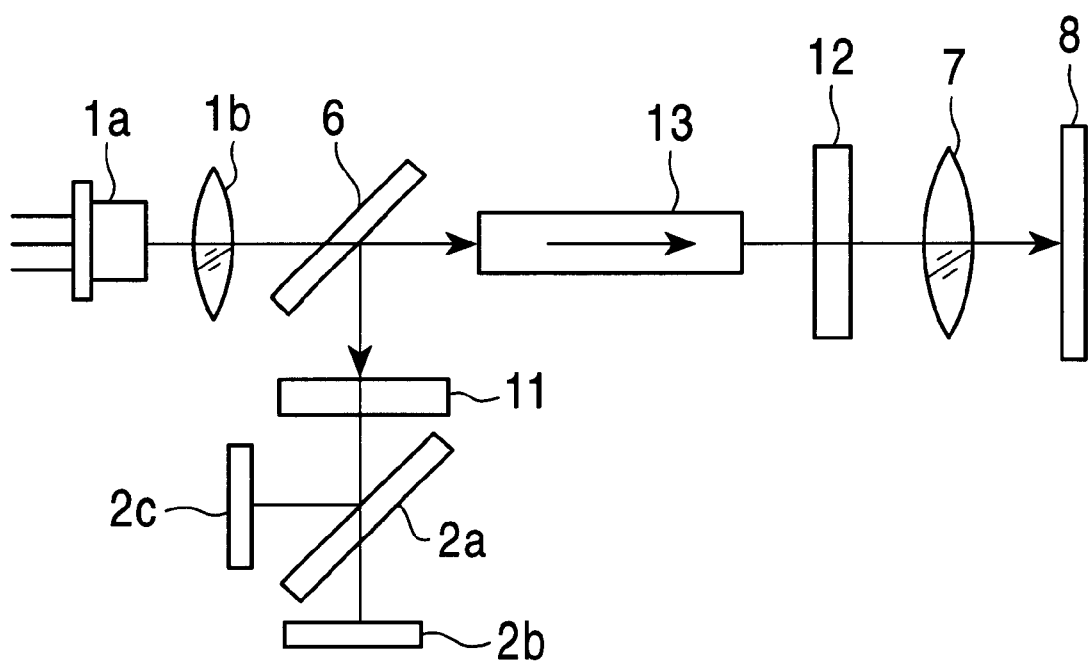
FIG. 7 is a schematic optical system diagram illustrating a ¼ wave plate according to the present invention.

Next, the correction of the variation in the phase difference of the field oscillation component of the light propagated through the polarization-preserving optical fiber 13 by using the ¼ wave plates 11 and 12 arranged in the optical paths on both sides of the polarization-preserving optical fiber 13 will be described with reference to FIG. 7, which is a schematic optical system diagram, and FIGS. 8, 9 and 10, which are schematic polarization state diagrams as seen from the direction in which the light travels. In FIG. 7, the signal optical path switching means 3 is omitted from the schematic diagram of FIG. 2 showing the optical disc apparatus. However, it is desirable for dielectric layers to be formed on the reflection surfaces of the pair of mirrors 3a and 3b formed in the signal optical path switching means 3, and it is necessary for the phase change in the field oscillation component due to reflection to be set to an integral multiple of π.

Figure 8:
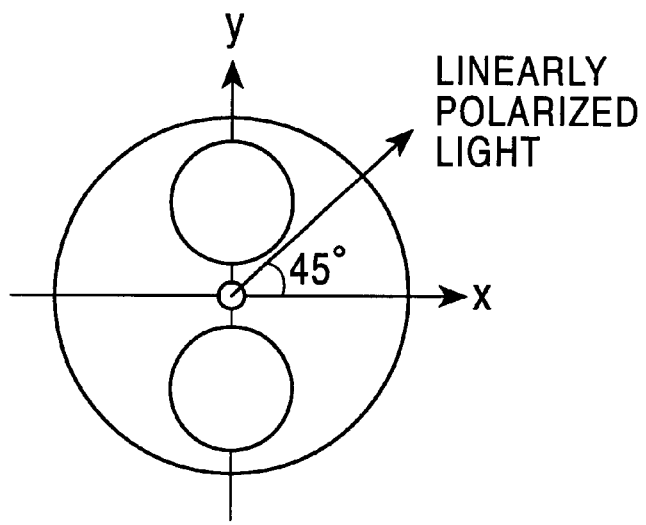
FIG. 8 is a schematic polarization state diagram of the polarization state of light impinging upon the polarization-preserving preserving optical fiber from the light source in FIG. 7 as seen from the direction in which the light travels.
Figure 9:
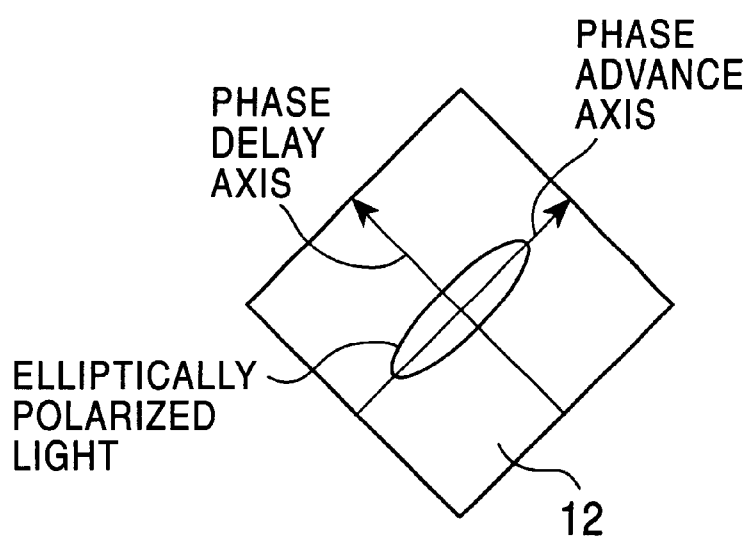
FIG. 9 is a schematic polarization state diagram of the polarization state of light propagated from the polarization-preserving optical fiber to one ¼ wave plate in FIG. 7 as seen from the direction in which the light travels.

The output light from the semiconductor laser 1a is linearly polarized light, and, as shown in FIG. 8, inclined by 45 degrees with respect to the x-axis of the polarization-preserving optical fiber 13. The output light from the semiconductor laser 1a propagates through the polarization-preserving optical fiber 13; due to the influence of the phase difference generated due to the birefringence of the polarization-preserving optical fiber 13 during this propagation, it becomes elliptically polarized light or circularly polarized light as shown in FIG. 9. The light which has thus become elliptically polarized light or circularly polarized light impinges upon the ¼ wave plate 12 the phase advance axis of which is inclined 45 degrees. As shown in FIG. 10, the light transmitted through the ¼ wave plate is restored to linearly polarized light. However, the angle $\theta_p$ the linearly polarized light makes with the x-axis varies according to the phase difference of the field oscillation component due to the polarization-preserving optical fiber 13. In the magneto-optical disc 8, it is necessary to detect the Kerr rotation angle, and it is desirable for linearly polarized light to impinge upon the magneto-optical disc 8.

The variation in the phase of the field oscillation component will be described by using Jones matrix. Jones matrix is a kind of notation expressing polarization state of light. The polarization state of light emitted from the semiconductor laser 1a can be expressed by the following formula (1).

$$\text{Semiconductor laser} \rightarrow \begin{pmatrix} 1 \\ 1 \end{pmatrix} \quad (1)$$

Assuming that the phase difference of the field oscillation component generated by the birefringence of the polarization-preserving optical fiber 13 is Δ, the polarized light variation the light emitted from the semiconductor laser 1a undergoes can be expressed by the following formula.

$$\text{Polarization-preserving optical fiber} \rightarrow \begin{pmatrix} E_{xpi}\frac{\Delta}{2} & 0 \\ 0 & E_{xp-i}\frac{\Delta}{2} \end{pmatrix} \quad (2)$$

(where i is an imaginary number, and Δ is the phase difference due to the polarization-preserving optical fiber)

The variation in the phase of the field oscillation component due to the ¼ wave plate 12 the phase advance axis of which is inclined by +45 degrees can be expressed as follows.

$$1/4 \text{ wave plate inclined } +45 \text{ degrees} \rightarrow \begin{pmatrix} 1 & i \\ i & 1 \end{pmatrix} \quad (3)$$

(where i is an imaginary number)

By multiplying the above formulas (1), (2) and (3), the following formula (4) is obtained.

$$\begin{pmatrix} 1 & i \\ i & 1 \end{pmatrix} \begin{pmatrix} E_{xpi}\frac{\Delta}{2} & 0 \\ 0 & E_{xp-i}\frac{\Delta}{2} \end{pmatrix} \begin{pmatrix} 1 \\ 1 \end{pmatrix} \rightarrow \begin{pmatrix} 1 \\ \frac{\cos\frac{\Delta}{2} - \sin\frac{\Delta}{2}}{\cos\frac{\Delta}{2} + \sin\frac{\Delta}{2}} \end{pmatrix} \quad (4)$$

Figure 10:
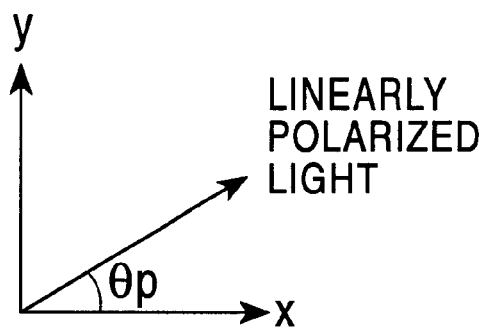
FIG. 10 is a schematic polarization state diagram of the polarization state of light transmitted through one ¼ wave plate and traveling to the magneto-optical disc in FIG. 7 as seen from the direction in which the light travels.

When normalization is effected to make this easier to understand, the polarization state of the light impinging upon the magneto-optical disc 8, that is, the imaginary number i in the Jones matrix, indicates the phase difference of the field oscillation component, so that it can be seen that the polarized light impinging upon the magneto-optical disc 8 is linearly polarized light as shown in FIG. 10. However, the inclination depends upon the phase difference of the polarization-preserving optical fiber 13. When recording a magneto-optical signal, the temperature of the light spot formed on the magneto-optical disc 8 is set to be not lower than the Curie point. When reproducing a magneto-optical optical signal, the rotation of the plane of polarization due to the Kerr effect, that is, the Kerr rotation, is detected from the reflected light from the magneto-optical disc 8, whereby the signal is read.

Next, the polarization state of the reflected light from the magneto-optical disc 8 will be described with reference to FIG. 7 and FIGS. 11, 12, 13, 14 and 15, which are schematic polarization state diagrams as seen from the direction in which the light travels.

Figure 11:
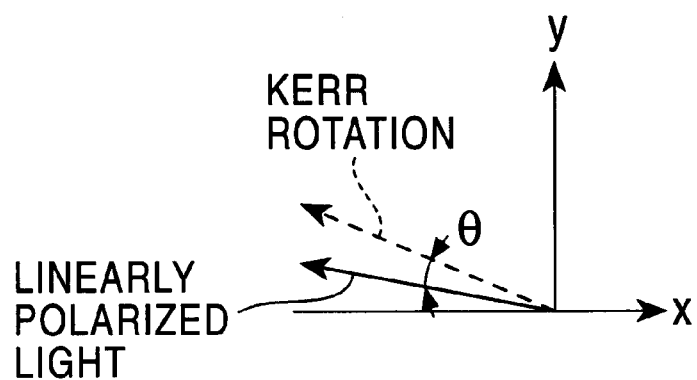
FIG. 11 is a schematic polarization state diagram of the polarization state of light reflected by the magneto-optical disc and propagated to one ¼ wave plate in FIG. 7 as seen from the direction in which the light travels.
Figure 12:
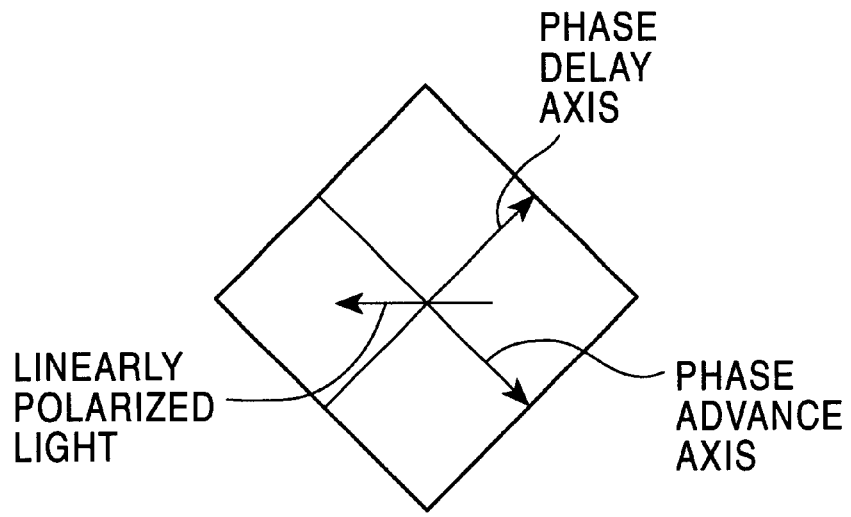
FIG. 12 is a diagram showing the inclination of the phase advance axis of one ¼ wave plate as seen from the magneto-optical disc side in FIG. 7.
Figure 13:
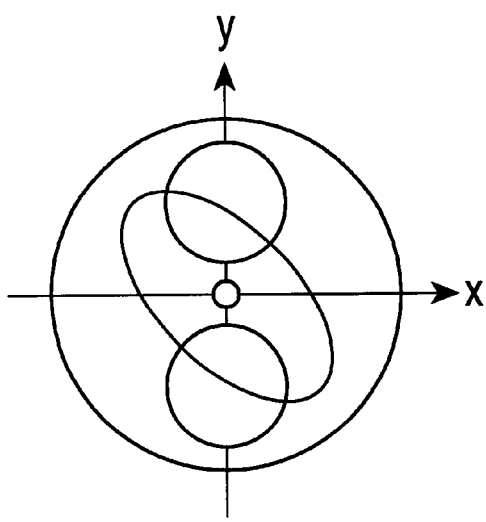
FIG. 13 is a schematic polarization state diagram of the polarization state of light transmitted through the polarization-preserving optical fiber and propagating to the other ¼ wave plate in FIG. 7 as seen from the direction in which the light travels.
Figure 14:
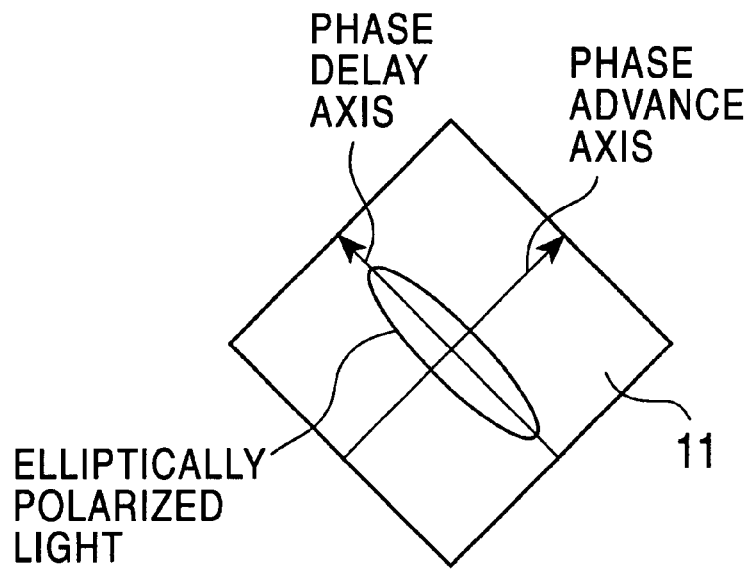
FIG. 14 is a schematic polarization state diagram of the polarization state of light transmitted through the polarization-preserving optical fiber and propagating to the other ¼ wave plate in FIG. 7 as seen from the direction in which the light travels.
Figure 15:
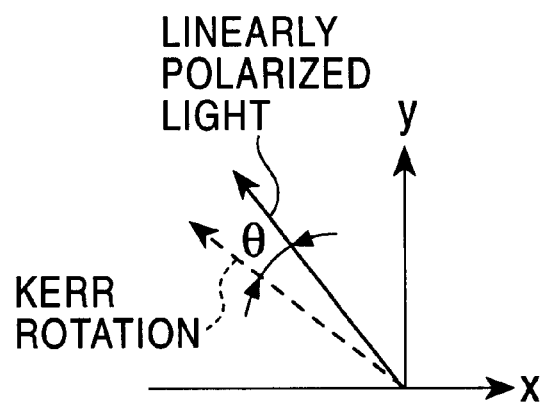
FIG. 15 is a schematic polarization state diagram of the polarization state of light transmitted through the other ¼ wave plate in FIG. 7 as seen from the direction in which the light travels.

As shown in FIG. 11, the plane of polarization of the reflected light from the magneto-optical disc 8 is rotated by the Kerr effect, and, in this polarized state, the light impinges upon the ¼ wave plate 12 again. At this time, the phase advance axis of the ¼ wave plate 12 is inclined by −45 degrees, which inclination is opposite to that in the case in which the light travels from the semiconductor laser 1a to the magneto-optical disc 8. That is, as shown in FIG. 12, the polarization state is reverse to the polarization state shown in FIG. 9. By being transmitted through this ¼ wave plate 12, the light becomes elliptically polarized light as shown in FIG. 13. The elliptically polarized light shown in FIG. 13 propagates through the polarization-preserving preserving optical fiber 13 and is reflected by the beam splitter 6 and impinges upon the ¼ wave plate 11. At this time, the light becomes elliptically polarized light as shown in FIG. 14. The elliptically polarized light shown in FIG. 14 is transmitted through the ¼ wave plate 11 the phase advance axis of which is inclined +45 degrees with respect to the x-axis, whereby the light becomes linearly polarized light again as shown in FIG. 15. At this time, when seen from the direction in which the magneto-optical signal light is received, the polarized light is inclined by an amount corresponding to the Kerr rotation from the polarized light of the output light from the semiconductor laser 1a, and it is possible to detect the magneto-optical signal.

The variation in the phase of the field oscillation component of the reflected light from the magneto-optical disc 8 will be explained by using a Jones matrix.

The light reflected by the magneto-optical disc 8 undergoes Kerr rotation, so that the polarization state of the light reflected by the magneto-optical disc 8 can be expressed by the following formula (5).

Reflected light that has undergone Kerr rotation→

$$\begin{pmatrix} \cos\theta & -\sin\theta \\ \sin\theta & \cos\theta \end{pmatrix} \begin{pmatrix} -1 \\ \frac{\cos\frac{\Delta}{2} - \sin\frac{\Delta}{2}}{\cos\frac{\Delta}{2} + \sin\frac{\Delta}{2}} \end{pmatrix} \quad (5)$$

(where θ is the Kerr rotation angle, and Δ is the phase difference due to the polarization-preserving optical fiber)

The polarized light of formula (5) impinges upon the ¼ wave plate 12. At this time, the phase advance axis of the ¼ wave plate 12 is inclined −45 degrees with respect to the x-axis, so that the polarization state can be expressed by the following formula (6).

$$1/4 \text{ wave plate inclined } -45 \text{ degrees} \rightarrow \begin{pmatrix} 1 & -i \\ -i & 1 \end{pmatrix} \quad (6)$$

(where i is an imaginary number)

Then, the light impinges upon the polarization-preserving preserving optical fiber 13, so that the above formula (2) is multiplied, and the light propagated through the polarization-preserving optical fiber 13 is reflected by the beam splitter 6, and the light impinges upon the ¼ phase plate 11 the phase advance axis of which is inclined +45 degrees with respect to the x-axis, so that the above formula (3) is multiplied. By multiplying the above formulas (5), (6), (2), and (3), the following formula (7) is obtained.

$$\begin{pmatrix} 1 & i \\ i & 1 \end{pmatrix} \begin{pmatrix} E_{xpi}\frac{\Delta}{2} & 0 \\ 0 & E_{xp-i}\frac{\Delta}{2} \end{pmatrix} \begin{pmatrix} 1 & -i \\ -i & 1 \end{pmatrix} \begin{pmatrix} \cos\theta & -\sin\theta \\ \sin\theta & \cos\theta \end{pmatrix} \begin{pmatrix} -1 \\ \frac{\cos\frac{\Delta}{2} - \sin\frac{\Delta}{2}}{\cos\frac{\Delta}{2} + \sin\frac{\Delta}{2}} \end{pmatrix} \rightarrow \quad (7)$$

$$\begin{pmatrix} 1 \\ -\frac{\cos\theta + \sin\theta}{\cos\theta - \sin\theta} \end{pmatrix}$$

As is apparent from formula (7), when normalization is effected with the x component, the imaginary number i disappears, and it can be seen that the light has become linearly polarized light. When the result of this formula (7)

is considered from the side where the light is received, the following formula (8) is obtained.

$$\begin{pmatrix} 1 \\ \frac{\cos\theta + \sin\theta}{\cos\theta - \sin\theta} \end{pmatrix} \quad (8)$$

(where θ is the Kerr rotation angle)

Further, formula (8) can be transformed into the following formula (9).

$$\frac{\cos\theta + \sin\theta}{\cos\theta - \sin\theta} = \frac{\sqrt{\frac{1}{2}}(\cos\theta + \sin\theta)}{\sqrt{\frac{1}{2}}(\cos\theta - \sin\theta)} = \frac{\sin\frac{\pi}{4}\cos\theta + \cos\frac{\pi}{4}\sin\theta}{\cos\frac{\pi}{4}\cos\theta - \sin\frac{\pi}{4}\sin\theta} = \tan(\frac{\pi}{4} + \theta) \quad (9)$$

As is apparent from formula (9), it is possible to detect a magneto-optical signal on the basis of polarized light rotated by the Kerr rotation angle around 45 degrees. While in regard to the above ¼ wave plates 11 and 12, description has been given by expressing it as ±45 degrees, using the phase advance axis as a reference, if the crystal axis of the phase advance axis and the phase delay axis is inclined by (45+90×N) degrees with respect to the refractive index distribution axis of the polarization-preserving preserving optical fiber 13, it is possible to correct the phase difference of the orthogonal field oscillation components of the magneto-optical signal light (N is an integer).

Figure 16:
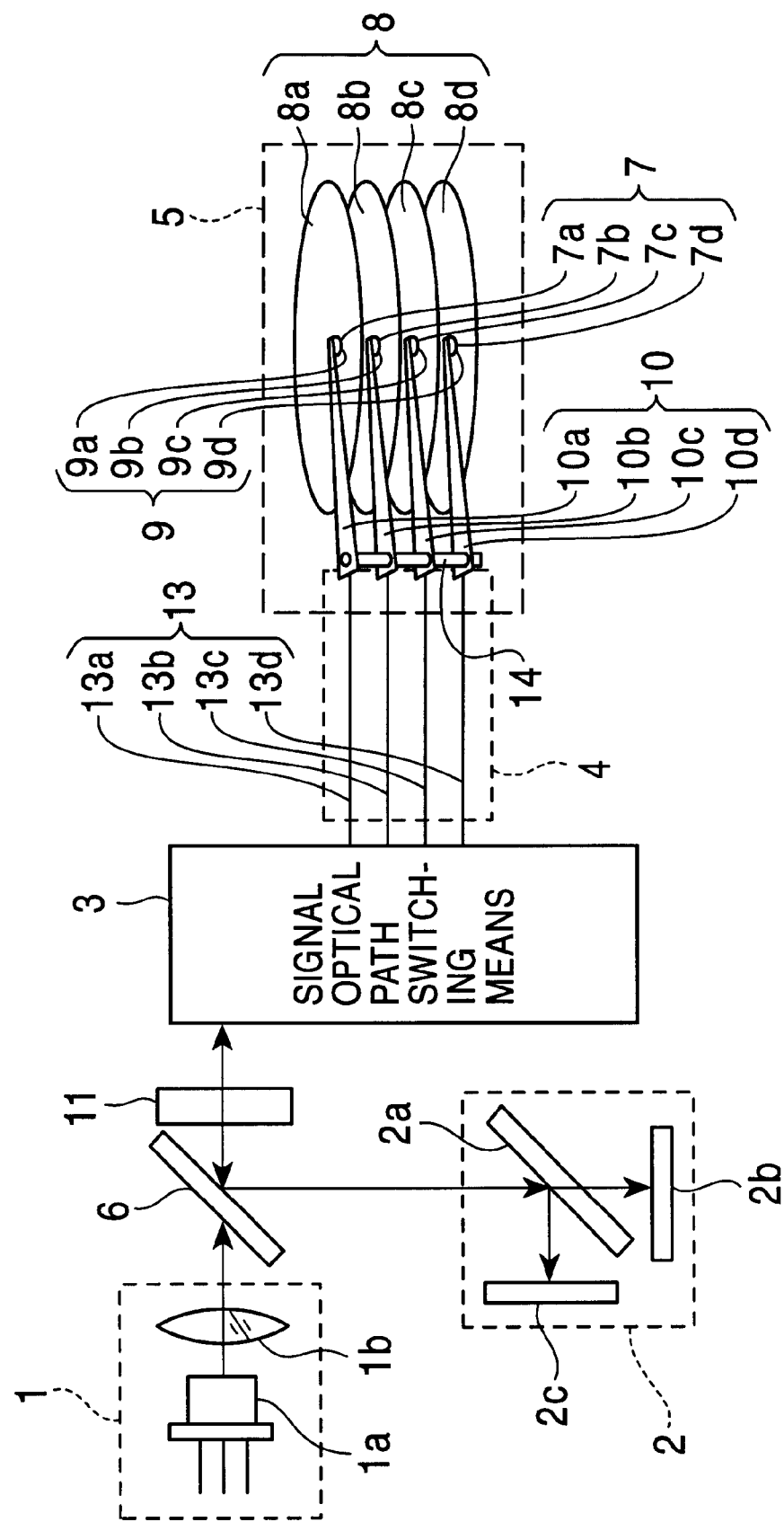
FIG. 16 is a schematic diagram showing another optical disc apparatus according to the first embodiment of the present invention.

FIG. 16 is a schematic diagram showing another example of the optical disc apparatus shown in FIG. 2, in which the ¼ wave plate 11 is arranged between the beam splitter 6 and the signal optical path switching means 3.

In this construction, the plane of polarization of the semiconductor laser 1a can coincide with the crystal axis of the ¼ wave plate 11. That is, the polarized light of the output light from the semiconductor laser 1a is not influenced by the ¼ wave plate 11. Further, since the ¼ wave plate 11 is in the vicinity of the polarization-preserving preserving optical fiber 13, the optical axis matching between the ¼ wave plate 11 and the polarization-preserving preserving optical fiber 13 can be easily effected. Though omitted in the drawing, it goes without saying that the ¼ wave plates 11 and 12 can be arranged so as to be in close contact with the end surfaces of the polarization-preserving optical fiber 13.

Second Embodiment

In this embodiment, the optical disc attached to the spindle motor is a magneto-optical disc, and two polarization-preserving optical fibers 13 of the same kind of which the refractive index distribution axes are orthogonal to each other so that the phase difference generated in the polarization-preserving optical fibers 13 may be canceled are joined together to form a single polarization-preserving optical fiber 13. First, the joining of two polarization-preserving optical fibers 13 of the same kind of which the refractive index distribution axes are orthogonal to each other will be described with reference to FIG. 17, which is a schematic diagram.

Figure 17:
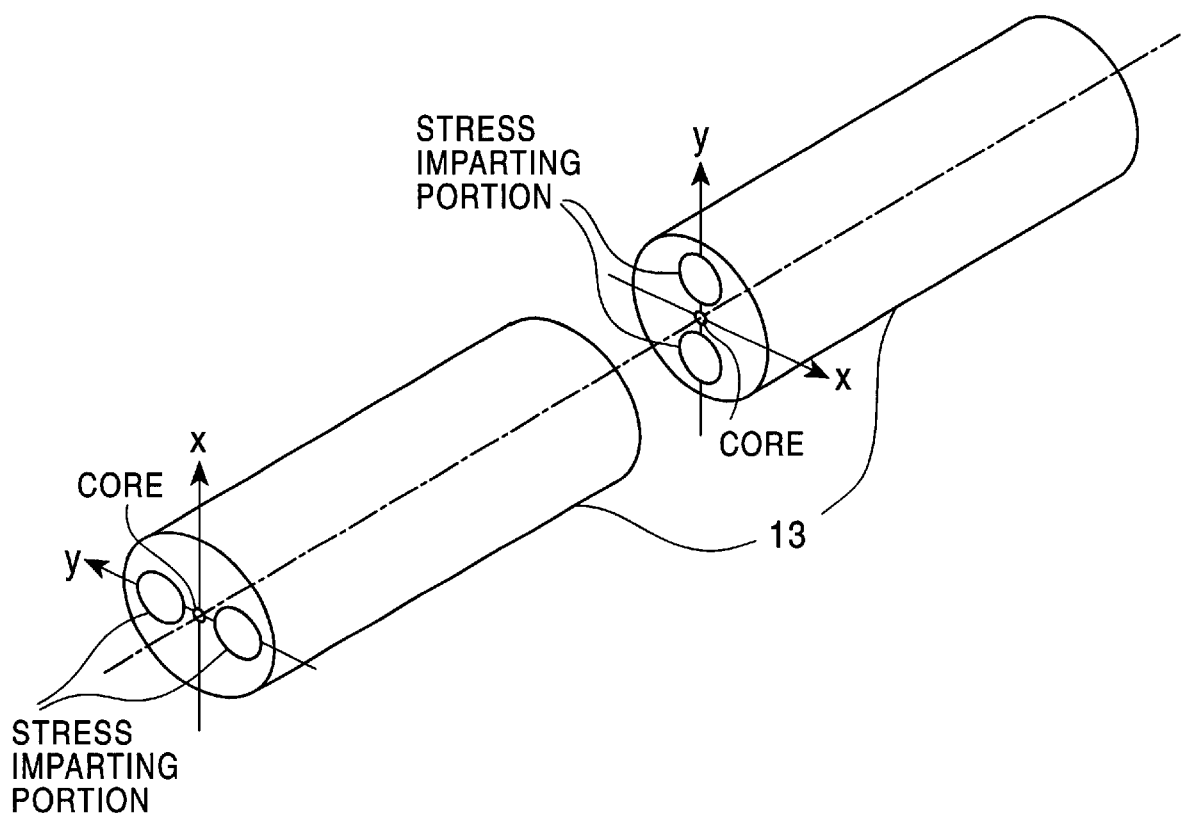
FIG. 17 is a schematic diagram illustrating a polarization-preserving optical fiber according to the second embodiment of the present invention.

As shown in FIG. 17, the two polarization-preserving optical fibers 13 of the same kind are joined together such that the stress imparting portions are orthogonal to each other, that is, the refractive index distribution axes are orthogonal to each other, whereby the phase difference generated in the polarization-preserving optical fibers 13 is canceled, and, there is no need to provide ¼ wave plates 11 and 12, which have been arranged in the optical paths on both sides of the polarization-preserving optical fiber 13 as in the first embodiment described above. The two polarization-preserving optical fibers 13 of the same kind the refractive index distribution axes of which are orthogonal to each other can be joined together, for example, by fusion through arc discharge, adhesion by using optical adhesive, or by arranging an optical lens between the joint surfaces.

Figure 18:
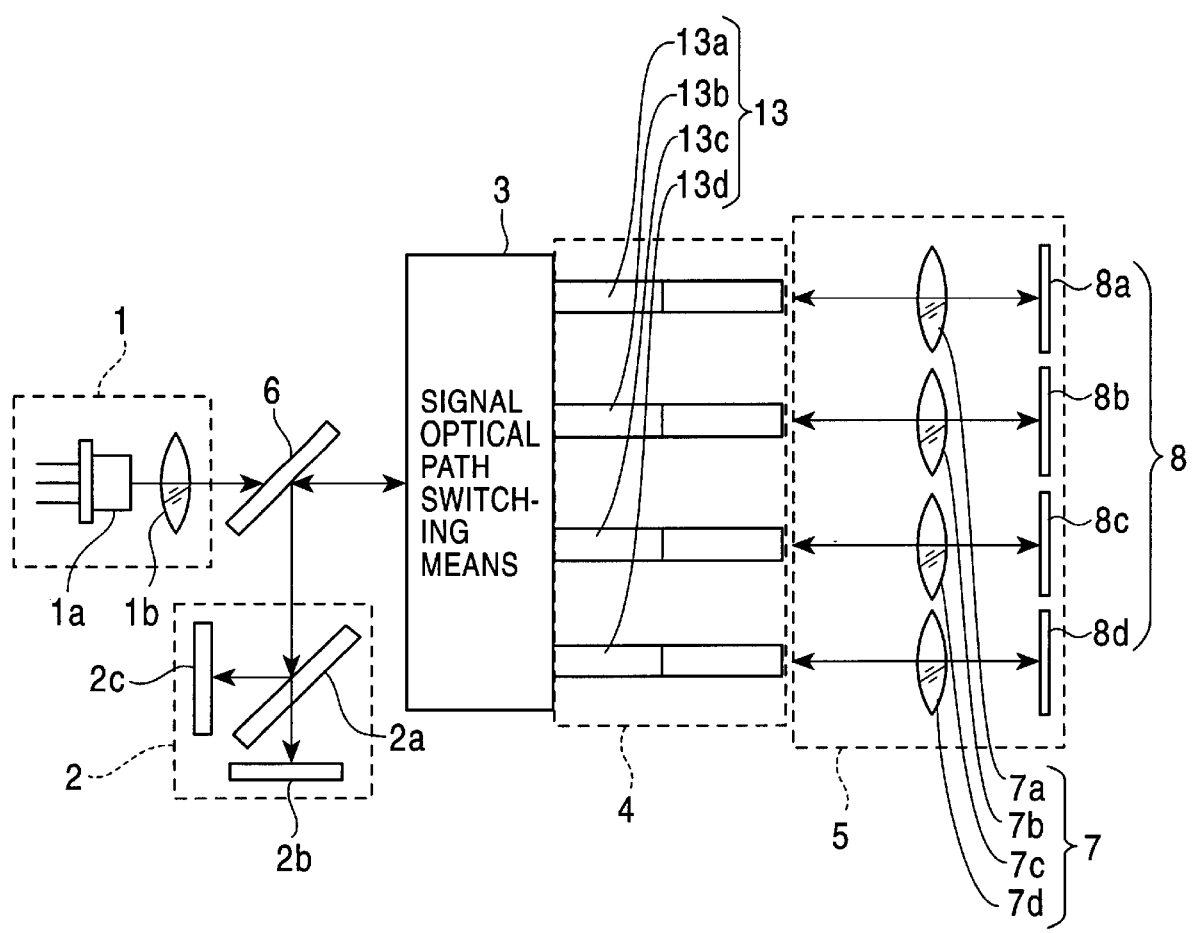
FIG. 18 is a schematic diagram showing an optical disc apparatus according to the second embodiment of the present invention.

FIG. 18 schematically shows the construction of the optical disc apparatus of this embodiment. In this construction, the signal light transfer means 4 is formed by the above polarization-preserving optical fiber 13, and no ¼ wave plates 11 and 12 are needed. Otherwise, the schematic construction of the light source portion 1, the signal detecting means 2, the signal optical path switching means 3, and the disc control means 5 is the same as that of the first embodiment described with reference to FIGS. 2 and 3, so a description thereof will be omitted.

While in the above-described first and second embodiments the magneto-optical disc 8 is attached to the spindle motor, in the present invention, the optical disc attached to the spindle motor is not restricted to the magneto-optical disc 8. It may also be a pit pattern disc such as CD, or a phase change disc such as DVD. For example, in the optical disc apparatus shown in FIG. 2, even in the case in which a pit pattern disc or a phase change disc is attached to the spindle motor instead of the magneto-optical disc 8, a reproduction signal can be reliably obtained from the sum signal of the photo detector 2b and the photo detector 2c, which receive signal light reflected by the signal recording surface and involving a variation in quantity of light.

In accordance with the present invention, it is possible to provide an optical disc apparatus which is compatible with both ROM type and RAM type optical discs having high density and large capacity.

What is claimed is:

1. An optical disc apparatus comprising:
   disc control means including
   an optical disc;
   a spindle motor for rotating the optical disc at a predetermined speed;
   an objective lens for forming a light spot on the optical disc; and
   control drive means which controls and drives the objective lens in the tracking direction of the optical disc;
   a light source;
   signal light transfer means in which the optical path for guiding output light from the light source to the objective lens is formed of a polarization-preserving optical fiber;
   a wave plate provided in an optical path on either side of the polarization-preserving optical fiber; and
   signal detecting means for receiving the reflected light from the optical disc and subjecting it to photoelectric conversion.

2. An optical disc apparatus comprising:
   disc control means including
   a plurality of optical discs;
   a spindle motor for rotating the plurality of optical discs integrally;
   a plurality of objective lenses for forming light spots on the individual optical discs; and
   control drive means for controlling and driving the plurality of objective lenses integrally in the tracking direction of the optical discs;

a light source;

signal light transfer means in which the optical paths for guiding output light from the light source to the individual objective lenses are formed of a plurality of polarization-preserving optical fibers;

a wave plate provided in the optical path on either side of the plurality of polarization-preserving optical fibers;

signal optical path switching means which is arranged between the light source and the signal light transfer means and which selects one from among the plurality of polarization-preserving optical fibers guiding output light from the light source; and signal detecting means which receives the reflected light from the optical disc and subjects it to photoelectric conversion.

3. An optical disc apparatus comprising:
disc control means including
a plurality of optical discs;
a spindle motor for rotating the plurality of optical discs integrally;
a plurality of objective lenses for forming light spots on the individual optical discs; and
control drive means which controls and drives the individual objective lenses independently in the tracking direction of the optical discs;

a light source;

signal light transfer means in which the optical paths for guiding output light from the light source to the individual objective lenses are formed of a plurality of polarization-preserving optical fibers;

a wave plate provided in the optical path on either side of the plurality of polarization-preserving optical fibers;

signal optical path switching means which is arranged between the light source and the signal light transfer means and which selects one from among the plurality of polarization-preserving optical fibers guiding output light from the light source; and signal detecting means which receives the reflected light from the optical disc and subjects it to photoelectric conversion.

4. An optical disc apparatus according to one of claims 1, 2 and 3, wherein the angle of the crystal axis of the wave plate is inclined (45+90×N) degrees with respect to the refractive index distribution axis of the polarization-preserving optical fiber (where N is an integer).

5. An optical disc apparatus according to one of claims 1, 2 and 3, wherein the optical disc is one of a pit pattern disc, a phase change disc, and a magneto-optical disc.

6. An optical disc apparatus according to claim 2 or 3, wherein the signal optical path switching means causes a phase difference of orthogonal field oscillation components of output light from the light source and reflected light from the optical disc to change by an integral multiple of $\pi$.

7. An optical disc apparatus according to claim 2 or 3, wherein the signal optical path switching means includes decentered light emitting means which outputs incident light incident in conformity with the rotation center axis from a position parallel to and decentered from the rotation center axis and wherein the plurality of polarization-preserving optical fibers are arranged in a circumference in conformity with the optical axis of the output light from the decentered light emitting means.

8. An optical disc apparatus comprising:
disc control means including
an optical disc;
a spindle motor for rotating the optical disc;
an objective lens for forming a light spot on the optical disc; and
control drive means which controls and drives the objective lens in the tracking direction of the optical disc;

a light source;

signal light transfer means in which the optical path guiding the output light from the light source to the objective lens is formed by one polarization-preserving optical fiber formed by joining two polarization-preserving optical fibers in which the refractive index distribution axes intersect each other at right angles; and signal detecting means for receiving the reflected light from the optical disc and subjecting it to photoelectric conversion.

9. An optical disc apparatus comprising:
disc control means including
a plurality of optical discs;
a spindle motor for rotating the plurality of discs integrally;
a plurality of objective lenses for forming light spots on the individual optical discs; and
control drive means for controlling and driving the plurality of objective lenses integrally in the tracking direction of the optical discs;

a light source;

signal light transfer means in which the optical path guiding the output light from the light source to the individual objective lenses is formed of a plurality of polarization-preserving optical fibers formed by joining two polarization-preserving optical fibers in which the refractive index distribution axes intersect each other at right angles;

signal optical path switching means which is arranged between the light source and the signal light transfer means and which selects one from among the plurality of polarization-preserving optical fibers guiding output light from the light source; and signal detecting means for receiving the reflected light from the optical disc and subjecting it to photoelectric conversion.

10. An optical disc apparatus comprising:
disc control means including
a plurality of optical discs;
a spindle motor for rotating the plurality of optical discs integrally;
a plurality of objective lenses for forming light spots on the individual optical discs; and
control drive means which controls and drives the objective lenses independently in the tracking direction of the optical discs;

a light source formed;

signal light transfer means in which the optical path guiding the output light from the light source to the individual objective lenses is formed of a plurality of polarization-preserving optical fibers formed by joining two polarization-preserving optical fibers in which the refractive index distribution axes intersect each other at right angles;

signal optical path switching means which is arranged between the light source and the signal light transfer means and which selects one from among the plurality of polarization-preserving optical fibers guiding output light from the light source; and signal detecting means for receiving the reflected light from the optical disc and subjecting it to photoelectric conversion.

11. An optical disc apparatus according to one of claims 8, 9 and 10, wherein the optical disc is one of a pit pattern disc, a phase change disc, and a magneto-optical disc.

12. An optical disc apparatus according to claim 9 or 10, wherein the signal optical path switching means causes a phase difference of orthogonal field oscillation components of output light from the light source and reflected light from the optical disc to change by an integral multiple of $\pi$.

13. An optical disc apparatus according to claim 9 or 10, wherein the signal optical path switching means includes decentered light emitting means which outputs incident light incident in conformity with the rotation center axis from a position parallel to and decentered from the rotation center axis and wherein the plurality of polarization-preserving optical fibers are arranged in a circumference in conformity with the optical axis of the output light from the decentered light emitting means.

* * * * *